US007581153B2

(12) United States Patent
Micheloni et al.

(10) Patent No.: US 7,581,153 B2
(45) Date of Patent: Aug. 25, 2009

(54) MEMORY WITH EMBEDDED ERROR CORRECTION CODES

(76) Inventors: Rino Micheloni, Via Luini, 11, Turate (IT) 22078; Roberto Ravasio, Via Mazzini, 3, Ponte San Pietro (IT) 24036; Angelo Bovino, Franzione San Giorgio - Via Gremsen, 21, Brunico (IT) 39031; Vincenzo Altieri, Via Trentola, 210, Ercolano (IT) 80056

( * ) Notice: Subject to any disclaimer, the term of this patent is extended or adjusted under 35 U.S.C. 154(b) by 518 days.

(21) Appl. No.: 11/221,584

(22) Filed: Sep. 8, 2005

(65) Prior Publication Data

US 2006/0059406 A1   Mar. 16, 2006

(30) Foreign Application Priority Data

Sep. 10, 2004   (EP) .................................. 04425678

(51) Int. Cl.
  *G11C 29/00*   (2006.01)
(52) U.S. Cl. ................................ 714/763; 714/E11.056
(58) Field of Classification Search .................. 714/763
  See application file for complete search history.

(56) References Cited

U.S. PATENT DOCUMENTS 4,249,253 A   2/1981   Gentili et al. ................. 371/38
5,961,660 A   10/1999  Capps, Jr. et al. ............ 714/763
7,383,472 B2*  6/2008  Miura .......................... 714/42
2002/0018389 A1  2/2002  Ito et al. ...................... 365/222
2003/0156473 A1*  8/2003  Sinclair et al. .............. 365/200
2004/0083334 A1  4/2004  Chang et al. ................. 711/103

OTHER PUBLICATIONS

Furutani, K., et al., "A Built-in Hamming Code ECC Circuit for DRAM's," *IEEE J. Solid-State Circuits*, 24(1):50-56, Feb. 1989.
Gregori, S., et al., "On-Chip Error Correcting Techniques for New-Generation Flash Memories," *Proceedings of the IEEE*, 91(4):602-616, Apr. 2003.
Tanzawa, T., et al., "A Compact On-Chip ECC For Low-Cost Flash Memories," *IEEE J. Solid-State Circuits*, 32(5):662-669, May 1997.

* cited by examiner

*Primary Examiner*—Guy J Lamarre
(74) *Attorney, Agent, or Firm*—Schwabe Williamson & Wyatt

(57) ABSTRACT

A memory has one bus for data, addresses, and commands. A data register is coupled to the bus to store the data written to and read from the memory, a command register is coupled to the bus for receiving memory commands, and an address register is coupled to the bus to address the memory. The memory also includes an Error Correction Code circuit for calculating an ECC. The memory is configured to be responsive to external commands for controlling the operation of the ECC circuit for reading or writing of the ECC that are separate from external commands controlling reads or writes of the memory data. The memory may also include a status register that stores information regarding the passing or failing of the ECC.

27 Claims, 4 Drawing Sheets

MEMORY WITH EMBEDDED ERROR CORRECTION CODES

BACKGROUND OF THE INVENTION

1. Field of the Invention

The present invention relates to memories (e.g., NAND- or NOR-type flash memories) and, more particularly, to embedded error correction codes (ECC) within such memories.

2. Description of the Related Art

In the last few years, semiconductor memories have been produced with very high storage capacities. Such increases in storage capacity have been achieved by using multi-level storage. The multi-level storage allows many bits of information to be stored within an individual memory cell, where before only a single bit could be stored.

It is moreover known that in order to read a two-level memory cell (storing 1 bit) an appropriate electric quantity linked to the state of the cell is compared with a reference value, and, according to the outcome of the comparison, it may be determined whether the memory cell contains a logic "0" or a logic "1".

In the case of cells that are able to store r bits, reading is carried out by comparing the electric quantity of the cell with 2r–1 reference levels. The outcome of the comparisons allows for reconstruction of the binary information contained in the cell.

The multilevel approach can be applied both to volatile memories (such as DRAM memories) and to nonvolatile memories (such as EEPROM and Flash memories). In either case, the increase in the number of bits per cell renders more critical the tolerance to disturbance, the retention of the information and the accuracy of the operations of reading and writing. Unfortunately, incremental increases in storage capacity tends to reduce the reliability. For these reasons it is believed that the use of error correcting codes (ECC) will be fundamental above all for high capacity multilevel memories.

At present, commercially available memory devices with larger capacities contain some hundreds of millions of bits, and in the next few years it is forecast that such memory devices will have even greater capacity. This increase in the number of cells tends to reduce the mean time to failure (MTTF) of the entire memory device. However, given the need to create increasingly reliable equipment or systems, the level of reliability required for the individual memory component becomes increasingly stringent. However, errors in a memory chip cannot be eliminated completely and, generally, less errors in a memory require a reduction in performance or an increase in costs.

A very effective way to increase reliability is represented by the design of memories immune from error using ECC, which are codes that are able to detect and correct errors in the memory data. In particular, codes with correction of a single error, or detection of a double error and correction of single error, are used in semiconductor memory devices of various types. In this connection, see, for example, K. Furutani, K. Arimoto, H. Miyamoto, T. Kobayashi, K.-I. Yasuda, and K. Mashiko, "A Built-in Hamming Code ECC Circuit for DRAM's", IEEE J. Solid-State Circuits, Vol. 24, No. 1, February 1989, pp. 50-56, and T. Tanzawa, T. Tanaka, K. Takeuchi, R. Shirota, S. Aritome, H. Watanabe, G. Hemink, K. Shimizu, S. Sato, Y. Takeuchi, K. Ohuchi, "A Compact On-Chip ECC For Low-Cost Flash Memories", IEEE J. Solid-State Circuits, Vol. 32, No. 5, May 1997, pp. 662-669.

The errors in the memories are normally classified as "soft" errors and "hard" errors. "Soft" errors are a random, non-repetitive and non-permanent change in the state of a cell. "Soft" errors are caused by occasional electrical noise or are induced by radiation (a particles, cosmic rays, etc.) that affects a very limited number of cells at a time, and may be recovered in the next writing cycle. "Hard" errors are, instead, a permanent physical failure because of a fault present in the device. In practice, "hard" errors are much less frequent than "soft" errors.

ECCs enable drastic reduction in the effects of "soft" errors, which represent the more serious problem of the two, especially for multilevel memories. ECCs can moreover prove useful for the purpose of recovering some "hard" errors.

To protect the information stored in the memory using ECCs, it is necessary to add to each stored word a certain number of control bits appropriately calculated. The operation that associates to each stored word a precise value of the control bits is called encoding. The control bits calculated by the circuit that carries out encoding are stored together with the information word. Each word stored will be subsequently read together with the control bits that pertain to it. The decoding circuit is able to detect and correct a certain number of erroneous bits per word by appropriately comparing the value of the control bits with the value of the information bits.

The number of control bits necessary to add to each stored word is determined according to the length of the word itself and the number of errors per word that are desired to be corrected. Generally, error-correction encoding can be extended from the binary alphabet (containing only the two symbols "0" and "1") to an alphabet containing q symbols. In this case, encoding consists in the addition of a certain number of symbols (no longer of bits) to each word to be stored, and the correction of the errors includes the correction of the erroneous symbols.

Generally, the ECCs are managed outside of the memory by an external controller. For example, an external controller calculates an ECC associated with data and then stores the data with the ECC in the memory. When the external controller reads the data, it also reads the stored ECC. The external controller then performs the ECC check and possibly an error correction, if necessary. The burden on the external controller is great as the external controller must take care of ECC generation, checking, and tracking where in memory the ECCs are stored. However, the external controller does have complete control as to whether or not an ECC check is performed and the type of ECC check performed.

U.S. Patent application number U.S. 2004/0083334 A1 to Chang et al. describes a system wherein an ECC generator is incorporated within the memory, and allows for ECC calculation of subpages. However, there is no control provided to an external user whether or not an ECC will be performed and there is no control as to the type of ECC generated.

Thus, it is desirable to provide more flexibility and control regarding error correction through ECC for a user of a memory.

BRIEF SUMMARY OF THE INVENTION

One embodiment of the invention is directed to a memory device for implementing error correction codes. The memory includes: a memory array for storing data; a bus for data, addresses, and commands; a data register coupled to the bus to store the data written to and read from the memory array; a command register coupled to the bus for receiving memory commands; an address register coupled to the bus to address the memory array; and an Error Correction Code circuit coupled between the data register and the memory array for calculating an ECC. The memory includes means responsive to external commands for controlling the ECC circuit for reading or writing of the ECC that are separate from external commands controlling reads or writes of the memory data.

BRIEF DESCRIPTION OF THE SEVERAL VIEWS OF THE DRAWING(S)

One example embodiment of the present invention is now described, which proceeds with reference to the following drawings.

DETAILED DESCRIPTION OF THE INVENTION

Figure 1:
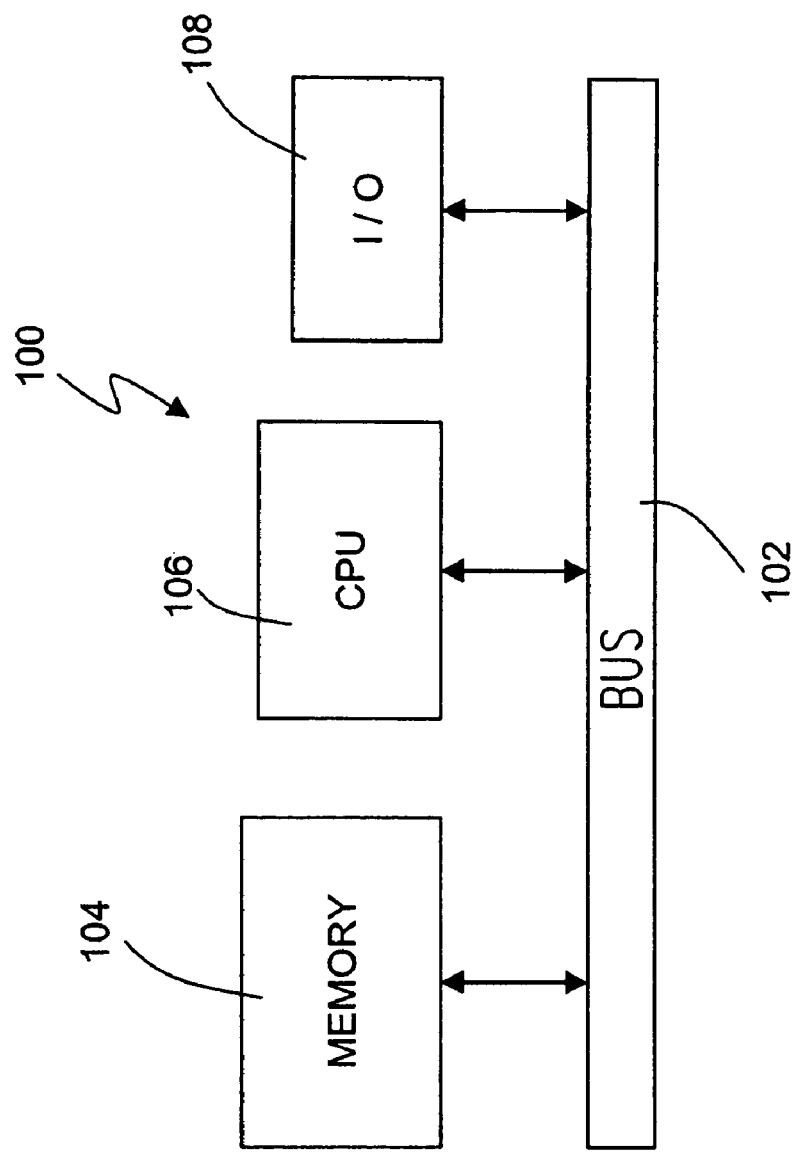
FIG. 1 is a high-level block diagram of a host system that includes a nonvolatile memory.

Referring to FIG. 1, a system 100 (e.g., digital camera, video camera, audio player, cellular phone, etc.) generally includes a system bus 102 allowing communication between a nonvolatile memory device 104, a CPU 106, and an input/output device 108. It should be appreciated that the system 100 may include less components or other components, such as display and networking devices, which are not shown for simplicity.

In general, host system 100 may be capable of capturing information including, but not limited to, still image information, audio information, and video image information. Such information may be captured in real-time, and received by the host system 100 through direct connection or in a wireless manner. The host system 100 may be substantially any system that stores data or information, and retrieves data or information.

The nonvolatile memory device 104 may be a removable memory device and is arranged to interface with the system bus 102 to store information. The nonvolatile memory device 104 may be implemented on a single chip or a die, or alternatively may be implemented on a multi-chip module, or on multiple discrete components that may form a chip set. The memory may be any of a variety of memories such as NAND-, NOR-, and AND-type nonvolatile flash memories.

Figure 2:
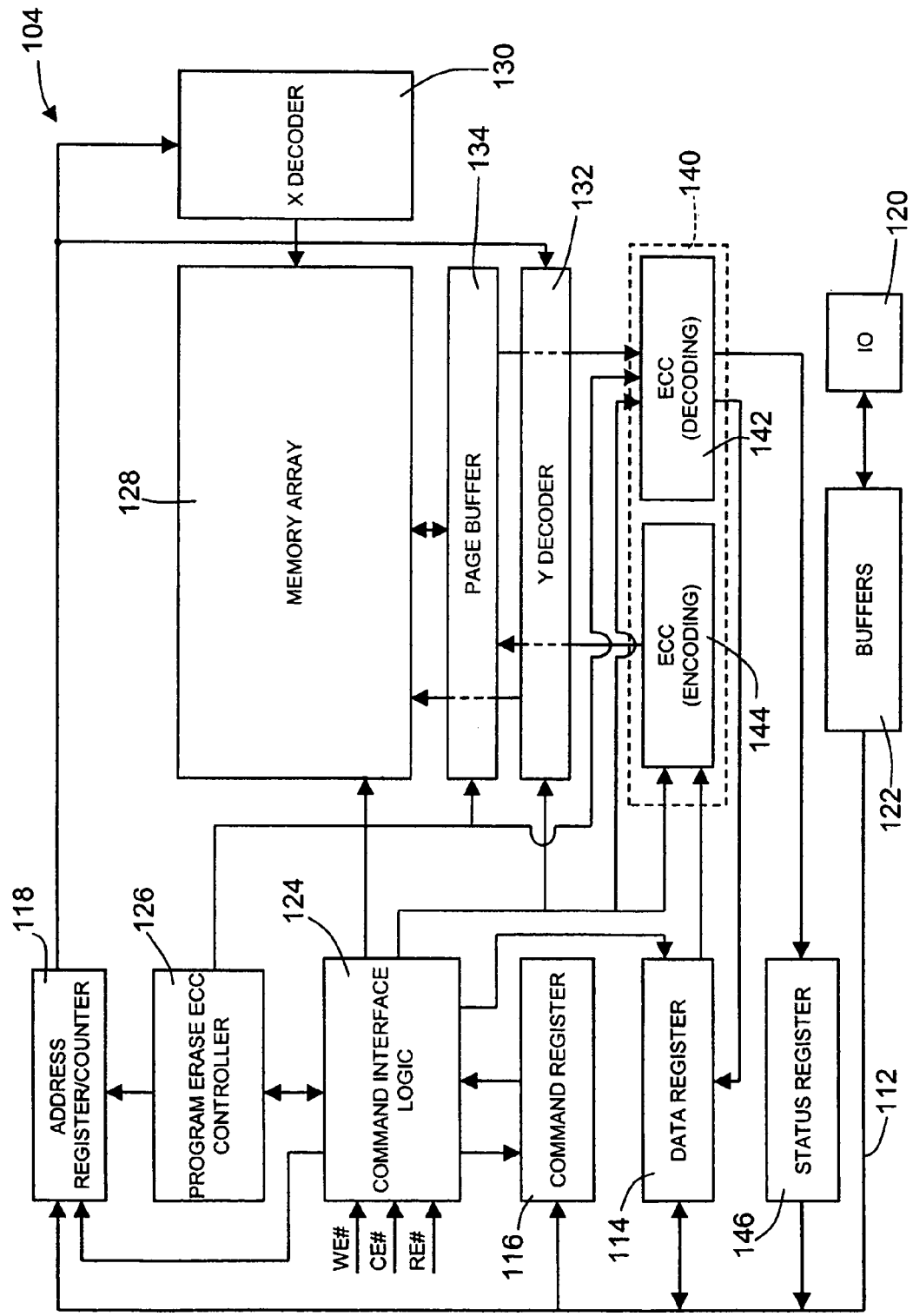
FIG. 2 is a detailed block diagram of the nonvolatile memory of FIG. 1.

FIG. 2 shows an exemplary detailed block diagram of the nonvolatile memory device 104. The memory device has a single internal bus 112 connecting a data register 114, a command register 116 and an address register/counter 118. The bus 112 is also connected to an I/O port 120 through input/output buffers 122 to allow for external communication, such as with system bus 102 (FIG. 1). The command register 116 receives commands from the I/O port 120 via the bus 112 and such commands are interpreted by a command interface logic 124 and a program/erase ECC controller 126. Together the command interface logic 124 and the program/erase ECC controller 126 provide the intelligence of the memory 104 and control the reading and writing of data to and from a memory array 128, as further described below.

The memory array 128 is addressed by means of an X decoder 130 and a Y decoder 132. The appropriate addresses are passed to the X and Y decoders 130, 132, by means of the address register 118. On a read of the memory 104, a page of the memory array 128 is passed to a page buffer 134 as addressed by the X and Y decoders 130, 132. On a write of the memory 104, the contents of the page buffer are written to the memory array 128. The page buffer 134 is generally the same width as a row of the memory array.

The command interface logic 124 is coupled to the command register 116 and also is coupled to receive external signals WE (write enable), RE (read enable) and CE (chip enable). The program/erase ECC controller 126 receives commands through the command interface logic 124 and controls the generation of the ECC by means of an ECC circuit 140 (also called an ECC accelerator). The ECC accelerator 140 includes an ECC decoder 142 and an ECC encoder 144. The ECC decoder 142 receives data to be output to the I/O port 120 and as the data passes through the ECC decoder, the ECC is checked in real time and contemporaneously as the data is output. Thus, there is no loss in time for ECC checking. The ECC encoder 144 receives data from the data register 114 and writes the data to the page buffer 134. As the data passes from the data register 114 to the page buffer 134, the ECC encoder generates the ECC in real time and contemporaneously as the data is input. Thus, the ECC generation is transparent to an external user, as the ECC generation does not require extra time for ECC computation.

A status register 146 is coupled to the ECC accelerator 140 and, particularly, the ECC decoder 142. After the ECC is generated, the ECC decoder 142 stores an indication in the status register 146 whether the ECC passed or failed. The status register 146 is then readable by an external user. If the ECC failed, the ECC accelerator 140 can provide alternative types of error correction routines based on a user request. For example, the user may choose to perform the error correction or the ECC accelerator can perform the error correction, or a combination of the two (i.e., a sharing of responsibilities). Three possible error correction routines are described, but other types of error correction routines may be used. In a first ECC error correction routine, an external user can read from the memory 104, without latency, the syndromes calculated in memory. The user can then use external hardware to correct the page or subpage read. In a second ECC error correction routine, the user can read a number of errors that occurred and, for each error, the address in which the error occurred. The user may also receive a byte or word with a one-hot encoded bit mask in order to find the error within the byte or word. In a third ECC error correction routine, the ECC accelerator 140 can perform the entire ECC correction. The external user must simply re-read the subpage or page and the data will be corrected.

Figure 3:
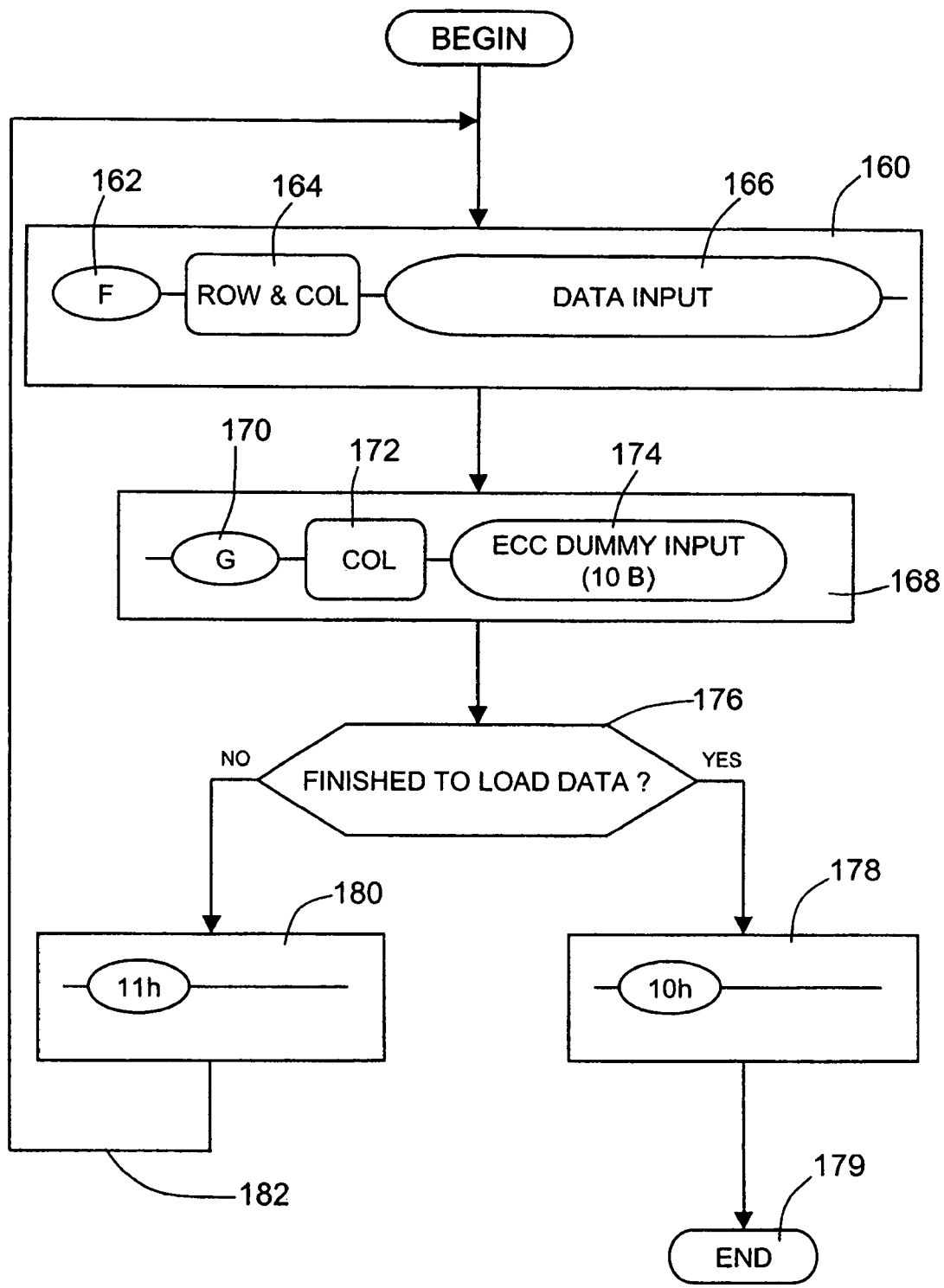
FIG. 3 is a flowchart showing a program mode of operation using the memory of FIG. 1.

FIG. 3 shows a flowchart of a method for programming the memory 104. In a first process block 160, data is loaded into the memory. First a user command is given at 162. Although a command of "F" is shown, any command, of course, may be used. Together with the command 162, address information 164, including a row and column, is provided to the memory. As well understood in the art, the row address is placed in the X decoder 130 (FIG. 2) and the column address is placed in the Y decoder 132. At 166, data is supplied from the I/O port 120 into the data register 114 in a serial manner via internal bus 112. During this phase, an internal counter within the address register 118 advances automatically and the data is stored in the page buffer 134. At process block 168, a dummy command of "G" is given. This command indicates that the user wants to calculate an ECC on the data that was input in process block 160. Thus, an ECC can be calculated based on a full page buffer 134 or only subparts (i.e., subpages) thereof. Column information 172 is also input by the user to indicate in which column to store the ECC. Row information is not necessary at this point because the ECC is stored in the same row as the data input in process block 160. Dummy input data is input at 174. This dummy data is ignored by the memory 104 and while the dummy input data is cycled, the ECC is stored starting at the requested column of the page buffer 134. At decision block 176, the user decides whether to load the page buffer 134 into the memory array 128, or to load another subpage. If the user provides a command 10H shown in process block 178, the data is loaded from the page buffer to the memory array 128 and the write operation is completed at 179. If the user provides a command 11H shown in process block 180, the process continues as shown by arrow 182, which allows the user to load another subpage. In this way, the user can decide to divide a page into an arbitrary number of subpages, each being a size as decided by the user. Moreover, the user may decide whether or not the subpages are separately protected by an ECC and the user has control over where the ECC is stored.

Figure 4:
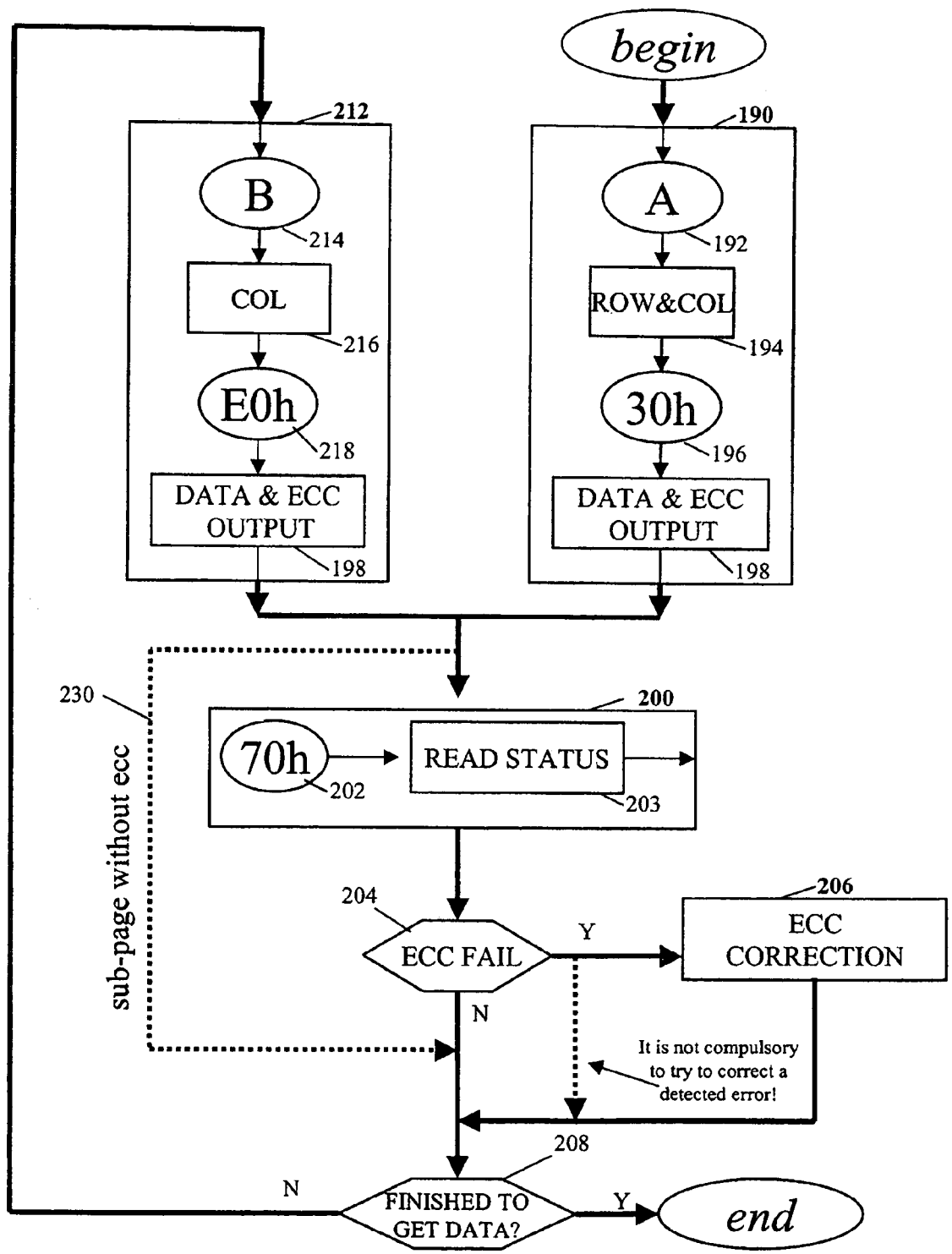
FIG. 4 is a flowchart showing a read mode of operation using the memory of FIG. 1.

FIG. 4 shows a flowchart of a method for performing a read of data within the memory 104. In process block 190, a command of A at 192 indicates a read command is desired. A row and column address are provided as shown at 194 as a starting point from which to read. A second command shown at 196 indicates that the user is ready to receive data. At 198 the data is provided on the I/O 120 to be read by the user, while at the same time, the ECC is being calculated in the ECC accelerator 140. After the user reads the desired number of cycles, the ECC accelerator 140 automatically updates the status register 146 indicating the passing or failing of the ECC. At this point, the user can read the status register 146 as shown at process block 200 to check if the ECC passed or failed. Of course, the user has the option not to read the status register 146 if they so choose. The read is accomplished by using the command shown at 202 which results in the status register data 203 being output on the I/O 120. At decision block 204, if the ECC failed, the user may choose to perform ECC error correction as shown at 206. But such error correction is not compulsory. Additionally, the user can control the type of ECC error correction routine as already discussed. Such error correction can be controlled through commands (not shown) to the memory instructing the ECC accelerator 140 on which type of ECC error correction routine is desired. The ECC accelerator then performs the error correction as instructed. If the ECC passed at decision block 204, then the method continues at decision block 208.

If the user does not desire to read more data from the same row, the method ends. Otherwise, in process block 212 the user provides a command of B as shown at 214 and the desired column from which to read at 216. The user then provides a command at 218 indicating that the user is ready for the data, which is provided to the user as shown at 198. While the data is read on the I/O 120, the ECC accelerator generates the ECC on the data read and loads a pass/fail indicator into the status register 146. Then the method continues again with process block 200 and the status is read, if desired. Also, as shown at 230, subpages without ECCs can automatically bypass process blocks 200 and 204. Thus, the user can instruct the memory 104 to perform continuous reads of subparts of a page buffer and separate ECCs are performed on each subpart, if desired. The user can then instruct the memory to perform error correction of the subparts. The initial read at 198 causes an access of memory array 128 to fill the page buffer 134, and thus there is a delay before data can be received. However, successive memory accesses such as those indicated at 212 do not require access of the memory array 128 and, thus, there is substantially no latency period after the first read.

Having illustrated and described the principles of the invention in a preferred embodiment, it should be apparent to those skilled in the art that the embodiment can be modified in arrangement and detail without departing from the scope of the invention, as defined in the appended claims.

For example, although particular commands were shown for purposes of illustration, any command set may be used, as those skilled in the art will readily appreciate.

Additionally, although a particular hardware design is shown, those skilled in the art will recognize that a variety of hardware designs can be used.

Furthermore, the memory can be used to perform the boot of the memory with ECC. For example, at power-on, page 0 is physically read and the above-described routines may be used to perform ECC error correction automatically.

Still further, the memory can be a multi-level memory or a more traditional memory wherein a memory cell stores only either a logic "0" or "1".

Further, it will be appreciated that the system of FIG. 1 is shown only to provide an example environment for the memory. The memory described herein can be used in any capacity and should not be considered limited to any particular system.

All of the above U.S. patents, U.S. patent application publications, U.S. patent applications, foreign patents, foreign patent applications and non-patent publications referred to in this specification and/or listed in the Application Data Sheet are incorporated herein by reference, in their entirety.

The invention claimed is:

1. A memory, comprising:
   a memory array for storing data;
   a bus for data, addresses, and commands;
   a data register coupled to the bus to store the data written to and read from the memory array;
   a command register coupled to the bus for receiving external memory commands for controlling the writing of the data to the memory array or the reading of the data from the memory array;
   an address register coupled to the bus to address the memory array;
   an Error Correction Code (ECC) circuit coupled between the data register and the memory array for calculating an ECC; and
   means responsive to external commands and structured to control the ECC circuit for selectively outputting to the bus information associated to the ECC or to store the ECC into the memory array, the external commands being different from the external memory commands controlling the writing of the data to the memory array or the reading of the data from the memory array.

2. The memory of claim 1, further including a status register coupled to the bus, the status register storing information associated with passing or failing of the ECC.

3. The memory of claim 1, wherein the memory is responsive to the external commands received in the command register, the external commands controlling a type of error correction performed by the ECC circuit.

4. The memory of claim 3, wherein the type of error correction performed by the ECC circuit includes any one of the following:
   a) calculating syndromes of the memory;
   b) calculating a number of errors and for each error determining a memory address where the error occurred; and
   c) correcting erroneous data stored in the memory.

5. The memory of claim 1, wherein the ECC is calculated by the ECC circuit contemporaneously while data is output from the memory.

6. The memory of claim 1, wherein the memory is any one of the following types: NAND-, NOR-, and AND-type non-volatile flash memories.

7. The memory of claim 1, wherein a command received in the command register that controls the writing of the ECC includes a column indicator to control in which column of a page the ECC is stored and includes dummy data that is ignored by the memory.

8. The memory of claim 1, wherein based on the external commands, the memory can perform reads or writes with or without an ECC, as controllable by an external user.

9. The memory of claim 1, wherein the memory includes a page buffer having the same width as the memory array and wherein a memory page may include multiple subpages, with each subpage being separately protected by an ECC.

10. The memory of claim 1, wherein a sequence of read commands requires only a column pointer after a first read command.

11. The memory of claim 1, wherein said means responsive to external commands for controlling the ECC circuit comprises a command interface logic configured to receive the external commands and an ECC controller coupled to command interface logic to receive the external commands through the command interface logic.

12. The memory of claim 11, wherein the command interface logic is further configured to receive external signals including one or more of read enable signals, write enable signals, and chip enable signals.

13. A method of implementing an Error Correction Code (ECC) in a memory having a memory array, comprising:
receiving, by the memory, external operation-control commands for controlling an ECC circuit of the memory, wherein the external operation-control commands are different from external memory commands for controlling the writing of data to the memory array or the reading of data from the memory array; and
controlling the operation of the ECC circuit to output to a bus information associated to the ECC, or to store the ECC into the memory array.

14. The method of claim 13, wherein at least one of the operation-control commands is an external command that controls the ECC by reading a status register coupled to the bus, the status register storing information regarding passing or failing of the ECC.

15. The method of claim 13, wherein at least one of the operation-control commands is an external command that controls a type of error correction performed by the ECC circuit.

16. The method of claim 15, wherein the type of error correction performed by the ECC circuit includes any one of the following:
a) calculating syndromes of the memory;
b) calculating a number of errors and for each error determining a memory address where the error occurred; and
c) correcting erroneous data stored in the memory.

17. The method of claim 13, further including calculating the ECC in the ECO circuit contemporaneously while data is output from the memory.

18. The method of claim 13, further including controlling the writing of the ECC by specifying a column indicator to control in which column of a page the ECC is stored.

19. The method of claim 13, wherein the memory includes a page buffer having the same width as the memory array and wherein a memory page may include multiple subpages, with each subpage being separately protected by an ECC.

20. The method of claim 13, wherein a sequence of read commands requires only a column pointer after a first read command.

21. A memory, comprising:
a memory array for storing data;
an Error Correction Code (ECC) circuit coupled between a data register and the memory array for calculating an ECC; and
an ECC controller coupled to the ECC circuit and structured to control the ECC circuit, responsive to an external ECC command, for selectively outputting to the bus information associated to the ECC or to store the ECC into the memory array, the external ECC command being different from external memory commands controlling writing of data to the memory array or the reading of data from the memory array.

22. The memory of claim 21, further comprising:
a command register coupled to the ECC controller and structured to receive the external memory commands for controlling the writing of the data to the memory array or the reading of the data from the memory array, wherein the ECC controller is a memory controller that controls the writing of the data to the memory array or the reading of the data from the memory array in response to the external memory command.

23. The memory of claim 21, wherein the ECC controller is structured to control a type of error correction performed by the ECC circuit in response to the external ECC command.

24. The memory of claim 23, wherein the type of error correction performed by the ECC circuit includes any one of the following:
a) calculating syndromes of the memory;
b) calculating a number of errors and for each error determining a memory address where the error occurred; and
c) correcting erroneous data stored in the memory.

25. The memory of claim 21, wherein the ECC circuit is structured to calculate the ECC contemporaneously while data is output from the memory.

26. The memory of claim 21, wherein the external ECC command includes a column indicator to control in which column of a page the ECC is stored and includes dummy data that is ignored by the memory array.

27. The memory of claim 21, further comprising a page buffer having a page width that is equal to a page width of the memory array, wherein the memory array includes a page having plural subpages, with each subpage being separately protected by an ECC.

* * * * *

UNITED STATES PATENT AND TRADEMARK OFFICE
CERTIFICATE OF CORRECTION

PATENT NO. : 7,581,153 B2  
APPLICATION NO. : 11/221584  
DATED : August 25, 2009  
INVENTOR(S) : Micheloni et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 869 days.

Signed and Sealed this

Fourteenth Day of September, 2010

David J. Kappos  
*Director of the United States Patent and Trademark Office*